United States Patent Office — 3,133,064, Patented May 12, 1964

3,133,064
DICYANOMETHYLENEPYRIDAZINE

Thomas J. Kealy, Wilmington, Del., assignor to E. I. du Pont de Nemours and Company, Wilmington, Del., a corporation of Delaware
No Drawing. Filed Oct. 20, 1961, Ser. No. 146,434
11 Claims. (Cl. 260—250)

This invention relates to a new class of functionally substituted heterocycles of the following structural formula:

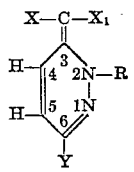

where X and $X_1$, which may be the same or different, represent carboxyl cyano, carbacyl halide

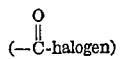

carboxyester

carbamoyl (—$CONH_2$), N-monosubstituted carbamoyl (—CONHQ), and N,N-disubstituted carbamoyl

Q being loweralkyl; R is hydrogen or R', the latter being alkyl of no more than 8 carbons or phenethyl; and Y is halogen of atomic number 17–53 (chlorine, bromine, and iodine), alkoxy, or alkylmercapto in which the hydrocarbon moieties are preferably of no more than 8 carbons each.

These new 6-functionally substituted 3(2H)-disubstitutedmethylenepyridazines can be prepared by the condensation of the desired 3,6-difunctionally substituted pyridazine or pyridazinium salt and the requisite alkali metal form of the desired malonic acid derivative in accord with the following stoichiometry:

(I)
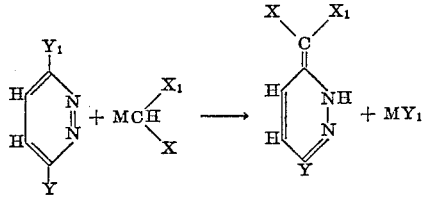

(II)
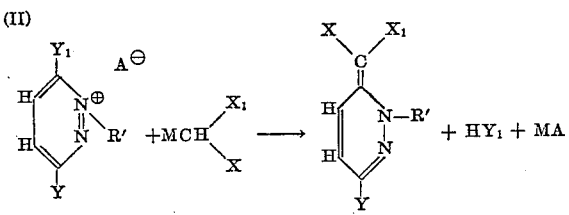

In Equations I and II, X, $X_1$ and R' are as previously defined; Y and $Y_1$, which may be the same or different, are Y as previously defined; A is a halide anion; and M is an alkali metal, preferably sodium.

The condensation reaction is an easy one to carry out, requiring no particularly stringent conditions of solvent, temperature, pressure, ratio of reactants, or other reaction variable. As is seen from the foregoing stoichiometry, the alkali metal-malonic acid derivative is condensed directly with the requisite 3,6-disubstituted pyridazine or 2-alkyl-3,6-disubstituted pyridazinium halide. Since the coreactants are consumed in equimolar amounts, it is preferred that they be employed in about a 1:1 molar ratio.

As illustrated by Equation I, when there is no substituent on ring nitrogen in the 2-position, one molar proportion of alkali metal derivative resulting from interaction of the alkali metal portion of the malonic acid-type coreactant and the substituent in the 3-position will be formed with subsequent bond rearrangement to afford the 3(2H)-disubstitutedmethylenepyridazine configuration. In those instances wherein there is an alkyl or phenethyl substituent on the 2-position, as in Equation II, the starting pyridazine coreactant will normally be used in the form of a pyridazinium halide, in which instance there will be formed as by-products a molar proportion of the alkali metal halide resulting from interaction of the alkali metal portion of the malonic acid coreactant and the halide of the pyridazinium halide as well as one molar proportion of the hydro form of the displaced substituent in the 3-position produced by interaction of said substituent with the hydrogen of the malonic acid-type coreactant.

Although Reactions I and II can be carried out in the absence of a solvent or diluent, it is preferred that an inert reaction medium be used to improve contact between the coreactants thereby increasing the efficiency of the reaction. Suitable reaction solvents (or in some cases diluents when all of the reactants are not soluble therein, in which case the reaction is carried out in suspension) include the aromatic, aliphatic, alkaromatic, araliphatic, and cycloaliphatic hydrocarbons or, less desirably, halohydrocarbon solvents, generally of no more than about 12 carbons; and the liquid acyclic and cyclic hydrocarbon ethers such as diethyl ether, di-n-propyl ether, tetrahydrofuran, and the like.

The requisite coreactants, preferably in solution or suspension in an inert reaction medium as described above, are simply brought together in intimate admixture, preferably under anhydrous oxygen-free conditions, at a temperature in the range of about 50–200° C. for reaction times ranging from one hour to generally no greater than one day. As a matter of convenience, the reaction mixture generally is refluxed until the reaction is substantially complete. The reflux temperature will, of course, depend upon the particular components of the reaction mixture which preferably are chosen so that the operating temperature will lie in the above range. Depending on the choice of reaction medium, the by-product alkali metal halide, and/or alkali metal alkoxide or alkylmercaptide may precipitate out as formed and can be removed by filtration. Alternatively, the reaction diluents can be removed by distillation, and the entire residue extracted with water leaving the insoluble 2H-pyridazine derivative which can be further purified by conventional recrystallization and, if desired, decolorizing techniques. In those instances wherein the 2-nitrogen of the 2H-pyridazine product carries a hydrogen atom, the aqueous extract, which in these instances will contain some or all of said product, will normally be acidified with strong mineral acid prior to isolation of the 2H-pyridazine.

In addition to the above-described direct synthesis from the appropriate alkali metal-malonic acid derivative and 3,6-disubstituted pyridazine, the various products of this invention can also be prepared by inter-conversion among themselves, as will be apparent to those skilled in the chemical arts. For instance, as illustrated in the examples, the dicyanomethylene compound can be prepared directly; and by suitable treatment, e.g., hydrolysis, esterification, and the like, can be converted to allied derivatives wherein one or both of the nitrile functions are replaced by other desired functional substituent(s), e.g., carbamoyl, N-monosubstituted carbamoyl, N,N-disubstituted carbamoyl, carboxy, and carboxyester. Furthermore, this interconvertibility applies not only to the exocyclic substituents on the methylene carbon in the 3-position but also to the halogen, alkoxy, or alkylmercapto substituent on the 6-ring carbon, and to the hydrogen or alkyl substituent on the 2-nitrogen as will be illustrated in further detail in some of the examples which follow.

The following examples in which the parts given are by weight are submitted to further illustrate but not to limit the generic process and products of this invention.

*Example I*

Sodiomalononitrile was prepared by adding a suspension of 66 parts of malononitrile in about 120 parts of absolute ethyl alcohol to a mixture of 54 parts (an equimolar proportion based on the nitrile) of sodium methoxide in about 160 parts of ethyl alcohol. After stirring at room temperature for two hours, the reaction mixture was poured into about 1,000 parts of anhydrous diethyl ether and the resultant salt product was removed by filtration and dried under nitrogen. A stirred suspension of 11 parts of 3,6-dichloropyridazine [Druey et al., Helv. Chim. Acta 37, 121 (1954)] and 26 parts of sodiomalononitrile in about 180 parts of anhydrous tetrahydrofuran was refluxed for 22 hours. The reaction mixture was evaporated to dryness under reduced pressure, the resultant solid residue was taken up in about 250 parts of water, and the solution was treated with a commercial decolorizing charcoal and filtered. The filtrate was acidified with dilute aqueous hydrochloric acid and the resultant solid product was removed by filtration, washed with water and a small amount of ethanol, and dried. There was thus obtained 12.4 parts (94% of theory) of 6-chloro-3(2H)-dicyanomethylenepyridazine as a brown solid. The infrared spectrum of the first product as compared to that of a recrystallized sample showed the initial product to be of high purity as first isolated. An analytical sample was prepared by crystallization from ethyl alcohol to afford deep yellow crystals melting at 258° C. with decomposition.

*Analysis.*—Calcd. for $C_7H_3ClN_4$: C, 47.1%; H, 1.7%; N, 31.4%. Found: C, 47.3%; H, 2.0%; N, 31.4%.

The infrared spectrum of the product exhibits a shoulder at 3.1 microns for NH and 4.5 microns with shoulders at 4.55 and 4.57 microns for conjugated nitrile functions.

*Example II*

A stirred suspension of 32 parts of 1-methyl-3,6-bis(methylmercapto)pyridazinium iodide [Duffin et al., J. Chem. Soc. 3789 (1959)] and 9 parts of sodiomalononitrile in about 440 parts of anhydrous tetrahydrofuran was refluxed for three hours. The reaction mixture was evaporated to dryness under reduced pressure and the residue was treated with about 250 parts of water. The resultant suspension was filtered and the solid dried. There was thus obtained 20.7 parts (100% of theory) of 6-methyl-mercapto-2-methyl-3(2H)-dicyanomethylenepyridazine as an orange solid melting at 191.5–195.0° C. An analytical sample was prepared by crystallization from ethyl alcohol to afford yellow needles melting at 197.0–198.5° C.

*Analysis.*—Calcd. for $C_8H_8N_4S$: C, 52.9%; H, 4.0%; N, 27.4%; S, 15.7%. Found: C, 53.0%; H, 3.7%; N, 26.7%; S, 15.5%.

*Example III*

A solution of 1.78 parts of the 6-chloro-3(2H)-dicyanomethylenepyridazine of Example I in about 50 parts of 3 N-aqueous potassium hydroxide solution was refluxed for three hours. The solution was then cooled and acidified with dilute aqueous hydrochloric acid. The resultant solid was removed by filtration and dried to afford 1.0 part (62% of theory) of 6-chloro-3(2H)-carbamoylcyanomethylenepyridazine as an orange solid melting at 195–199° C. An analytical sample was prepared by crystallization from ethyl alcohol to afford orange needles melting at 214° C. with decomposition.

*Analysis.*—Calcd. for $C_7H_5ClN_4O$: C, 42.8%; H, 2.6%; N.E., 196.6. Found: C, 42.9%; H, 2.5%; N.E., 195.5.

The infrared spectrum of the product showed absorption at 2.95, 3.0, and 3.15 micron characteristic for —NH and —NH$_2$, at 4.57 micron characteristic of conjugated —CN, and at 6.1 micron characteristic of —CONH$_2$.

*Example IV*

A stirred mixture of 5.6 parts of the 6-chloro-3(2H)-dicyanomethylenepyridazine of Example I and 11.1 parts of sodiomalononitrile in about 120 parts of n-butyl alcohol was heated at the reflux for 12.5 hours. The reaction mixture was then evaporated to dryness under reduced pressure and the residue was dissolved in water. Acidification of the resultant solution with dilute aqueous hydrochloric acid followed by filtration and drying afforded 11 parts of brown solid. The crude product was boiled with about 320 parts of ethyl alcohol. The resultant hot suspension was treated with decolorizing charcoal and filtered. The resultant filtrate was concentrated, diluted with a small amount of water and again treated with decolorizing charcoal. This operation was repeated again to give a final volume of about 150 parts of solution, which on cooling deposited 2.2 parts (34% of theory) of 6-n-butoxy-3(2H)-dicyanomethylenepyridazine as yellow needles melting at 177.0–178.5° C. An analytical sample was prepared by recrystallization from ethanol and was obtained as yellow needles melting at 178.5–180.0° C.

*Analysis.*—Calcd. for $C_{11}H_{12}N_4O$: C, 61.1%; H, 5.6%; N.E., 216. Found: C, 61.0%; H, 5.8%; N.E., 216.

*Example V*

A mixture of 2.04 parts of the 6-methylmercapto-2-methyl-3(2H)-dicyanomethylenepyridazine of Example II and 0.88 part of sodiomalononitrile in about 44 parts of tetrahydrofuran was heated for six hours at 150° C. with agitation in a pressure vessel of internal capacity corresponding to 100 parts of water. The reactor was cooled to room temperature, vented, and the reactin mixture removed and evaporated to dryness under reduced pressure. The resultant dark residue was taken up in about 10 parts of water. On filtration there was obtained 0.9 part of insoluble brown solid, which was apparently unreacted 6-methyl-mercapto-2-methyl-3(2H)dicyanomethylenepyridazine. The filtrate was acidified with glacial acetic acid and the resultant solid removed by filtration and dried. There was thus obtained 0.5 part (26% of theory) of 6-methyl-mercapto-3(2H)-dicyanomethylenepyridazine as a brown solid. An analytical sample was prepared by crystallization from aqueous ethanol and was obtained as yellow crystals melting at 273–274° C.

*Analysis.*—Calcd. for $C_8H_6N_4S$: C, 50.5%; H, 3.2%. Found: C, 50.8%; H, 3.2%.

As is apparent from the foregoing detailed disclosures, the present invention is generic to 3(2H)-disubstituted-methylenepyridazines carrying in the 6-position a halogen, alkoxy, or alkylmercapto substituent wherein the two exocyclic valences of the methylene group in position 3 are satisfied by single and separate bondings to two groups of the class consisting of carboxyl, cyano, carbacyl halide, carboxyester, carbamoyl, and N- and N,N-mono- and disubstituted carbamoyl, which two groups can be alike or different. In addition to the new products prepared in the foregoing detailed examples, still other products of the invention can be prepared in similar fashion. For instance, from 3,6-dichloropyridazine and sodio diethyl malonate there is obtained 6-chloro-3(2H)-di(ethoxycarbonyl)methylenepyridazine. From 3-chloro- 6-ethoxypyridazine and sodio diethyl malonate there is obtained 6-ethoxy-3(2H)-di(ethoxycarbonyl)methylenepyridazine. From 3-chloro-6-ethoxypyridazine and sodiomalonamide there is obtained 6-ethoxy-3(2H)-dicarbamoylmethylenepyridazine. From 3-chloro-6-methylmercaptopyridazine and sodiomalonamide there is obtained 6-methylmercapto - 3(2H) - di(N,N - dimethylcarbamoyl) methylenepyridazine. From 2-ethyl-3,6-diethoxypyridazinium iodide and sodiomalononitrile there is obtained 6-ethoxy-3(2H)-dicyanomethylene-2-ethylpyridazine. From 2-ethyl-3,6-diethoxypyridazinium iodide and sodio diethyl malonate there is obtained 6-ethoxy-3(2H)-diethoxycarbonylmethylene-2-ethylpyridazine. From 2-(α-phenylethyl)-3,6-diethoxypyridazinium iodide and sodiomalononitrile there is obtained 6-ethoxy-3(2H)-dicyanomethylene-2-(α-phenylethyl)pyridazine. From 2-(n-pentyl)-3,6-bis-(methylmercapto)pyridazinium iodide and sodiomalononitrile there is obtained 6-methylmercapto-3(2H)-dicyanomethylene-2-(n-pentyl)pyridazine.

As has been stated previously, in addition to the foregoing illustrated direct condensation approaches to the new 3(2H)-disubstituted methylenepyridazines of the present invention, and as has been illustrated in some of the foregoing detailed examples, the 3(2H)-disubstituted methylenepyridazines are interconvertible among themselves. This interconvertibility applies not only to the two alike or different exocyclic substituents on the methylene carbon in the 3-position, but also to the halogen, alkoxy, or alkylmercapto substituent on the 6-ring carbon, and to the hydrogen or alkyl substituent on the 2-nitrogen. Thus, 3,6-dibromopyridazine can be condensed with sodiodimalonamide to from 6-bromo-3(2H)-dicarbamoylmethylenepyridazine, which product of the present invention can be converted to still other products by, for instance, condensing with methyl mercaptan, whereby there will be obtained 6-methylmercapto-3(2H)-dicarbamoylmethylenepyridazine, also a product falling within the generic product scope of the present invention. This latter product can still further be interconverted. Thus, by strong dehydration with phosphorus pentoxide at temperatures in the range of 150° C., the 3-dicarbamoylmethylene product can be converted to the 6-methylmercapto-3(2H)-dicyanomethylenepyridazine, which product can also be obtained by direct condensation between 3-chloro-6-methylmercaptopyridazine and sodiomalononitrile. Hydrolysis of 6-chloro-3(2H)-diethoxycarbonylmethylenepyridazine affords 6-chloro-3(2H)-dicarboxymethylenepyridazine. Hydrolysis of 6-ethoxy-3(2H)-diethoxycarbonylmethylenepyridazine affords 6 - ethoxy-3(2H)-dicarboxymethylenepyridazine. From 6-ethoxy-3(2H)-diethoxycarbonylmethylene-2-ethylpyridazine and ammonia there are obtained 6-ethoxy-3(2H)-ethoxycarbonylcarbamoylmethylene-2-ethylpyridazine and 6-ethoxy-3(2H)-dicarbamoylmethylene-2 - ethylpyridazine. From 6-chloro-3(2H)-diethoxycarbonylmethylenepyridazine and methylamine there are obtained 6-chloro-3(2H)-ethoxycarbonylmethylcarbamoylmethylenepyridazine and 6-chloro - 3(2H) - di(methylcarbamoyl)methylenepyridazine.

The 3(2H)-disubstitutedmethylene-6-, -alkoxy-, -halo-, and -alkylmercaptopyridazines of the present invention are useful as growth retardants for the cereal grain millet, so that the grain is less susceptible to wind damage and therefore more readily machine harvested. For example, the 6-n-butoxy-3(2H)-dicyanomethylenepyridazine and 6-methylmercapto-2 - methyl-3(2H) - dicyanomethylenepyridazine of Examples IV and II, respectively, showed the desired growth retardant effects when tested as follows.

The tests were carried out on 3-week old millet. The products were applied to the foliage as solutions in non-phytotoxic solvents such as acetone at a low dosage of ca. 1 lb./acre. Three weeks after application the millet was examined for effects on growth by comparison with untreated controls. The height, fresh weight, and dry weight of the treated and untreated millet were compared and the values listed represent the percent of the effect using the value for the controls as 100.

|  | Height | Fresh Weight | Dry Weight |
|---|---|---|---|
| 6-butoxy-3-dicyanomethylene- | 70 | 40 | 40 |
| 2-methyl-6-methylmercapto-3-dicyanomethylene- | 70 | 50 | 40 |

Salts of the substituted 2H-pyridazines of the invention (Lewis acids) and Lewis bases are readily prepared by admixing the Lewis acid and base in an inert reaction medium as will be understood by those skilled in art. Examples of such salts are methyltriphenylphosphonium⊕/6-chloro-3(2H) - dicyanomethylenepyridazinide⊖, triethylammonium⊕/6 - chloro-3(2H) - carbamoylcyanomethylenepyridazinide⊖, and triphenylsulfonium⊕/6-n-butoxy - 3(2H) - dicyanomethylenepyridazinide⊖. These salts are highly colored charge-transfer compounds which are useful as coloring agents or pigments for paper, cloth, and paint formulations.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

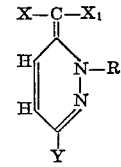

wherein X and $X_1$ each represent a member of the group consisting of carboxyl, cyano,

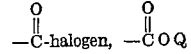

—$CONH_2$, —CONHQ, and —$CON(Q)_2$, Q being loweralkyl; R is selected from the group consisting of hydrogen, alkyl of up to 8 carbons, and phenethyl; and Y is selected from the group consisting of halogen of atomic number 17–35, alkoxy of up to 8 carbons, and alkylmercapto of up to 8 carbons.

2. 6-chloro-3(2H)-dicyanomethylenepyridazine.

3. 6-methylmercapto - 2 - methyl - 3(2H)-dicyanomethylenepyridazine.

4. 6-chloro - 3(2H) - carbamoylcyanomethylenepyridazine.

5. 6-n-butoxy-3(2H)-dicyanomethylenepyridazine.

6. 6-methylmercapto - 3(2H) - dicyanomethylenepyridazine.

7. Process which comprises reacting a pyridazine compound of a formula selected from the group consisting of

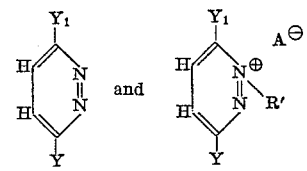

wherein each of Y and $Y_1$ is selected from the group consisting of halogen of atomic number 17–35, alkoxy of up to 8 carbons, and alkylmercapto of up to 8 carbons; R' is selected from the group consisting of alkyl of up to 8 carbons and phenethyl; and A is a halide anion, with a malonic acid derivative of the formula:

wherein X and $X_1$ each represent a member of the group consisting of carboxyl, cyano,

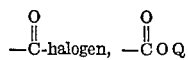

—$CONH_2$, —CONHQ, and —$CON(Q)_2$, Q being lower-alkyl; and M is an alkali metal.

8. The process of claim 7 wherein the reaction is carried out at a temperature of about 50–200° C.

9. The process of claim 7 wherein the reaction is conducted in an inert reaction medium.

10. The process which comprises reacting 3,6-dichloropyridazine with sodiomalononitrile.

11. The process which comprises reacting 1-methyl-3,6-bis(methylmercapto)pyridazinium iodide with sodiomalononitrile.

References Cited in the file of this patent

Fieser: Organic Chemistry (Third Edition, 1956), pages 46–7.